United States Patent

Janssen et al.

[15] 3,679,283

[45] July 25, 1972

[54] CARTRIDGE LOCK ACTUATOR

[72] Inventors: Donovan M. Janssen; Clarence G. Meyer, both of Boulder, Colo.

[73] Assignee: International Business Machines Corporation, Armonk, N.Y.

[22] Filed: March 10, 1971

[21] Appl. No.: 122,868

[52] U.S. Cl. ..................................312/319, 248/361, 274/11

[51] Int. Cl. ..................A47b 88/00, A47b 95/00, G11b 3/00

[58] Field of Search ...................274/4, 11; 180/82; 248/351; 312/319

[56] References Cited

UNITED STATES PATENTS

| | | | |
|---|---|---|---|
| 2,128,708 | 8/1938 | Kirk et al. | 248/361 X |
| 2,497,194 | 2/1950 | White | 248/361 |
| 3,146,846 | 12/1962 | Gutshall | 180/82 |
| 3,485,500 | 12/1969 | Loeschner et al. | 274/11 B |
| 3,432,169 | 3/1969 | Schroder | 274/4 B |
| 3,524,651 | 8/1970 | Ketzer | 274/4 |

*Primary Examiner*—Paul R. Gilliam
*Attorney*—Hanifin & Jancin and Herbert F. Somermeyer

[57] ABSTRACT

In a tape cassette or cartridge player, cassette locking is activated by cassette insertion. Unlocking is activated by a release button. The cassette is held in a cassette receiving well by two pivoted holddowns on opposite ends of the well. Clamping force is provided by placing a moment about the pivot point of the two holddowns. This moment is created by typing the two holddowns together with a flexible media and placing the media in tension. A spring-urged pivoted link supplies the tension and cooperates with cassette insertion and ejection mechanism for respectively pivoting the holddowns into cassette retention and release positions.

4 Claims, 5 Drawing Figures

FIG. 1
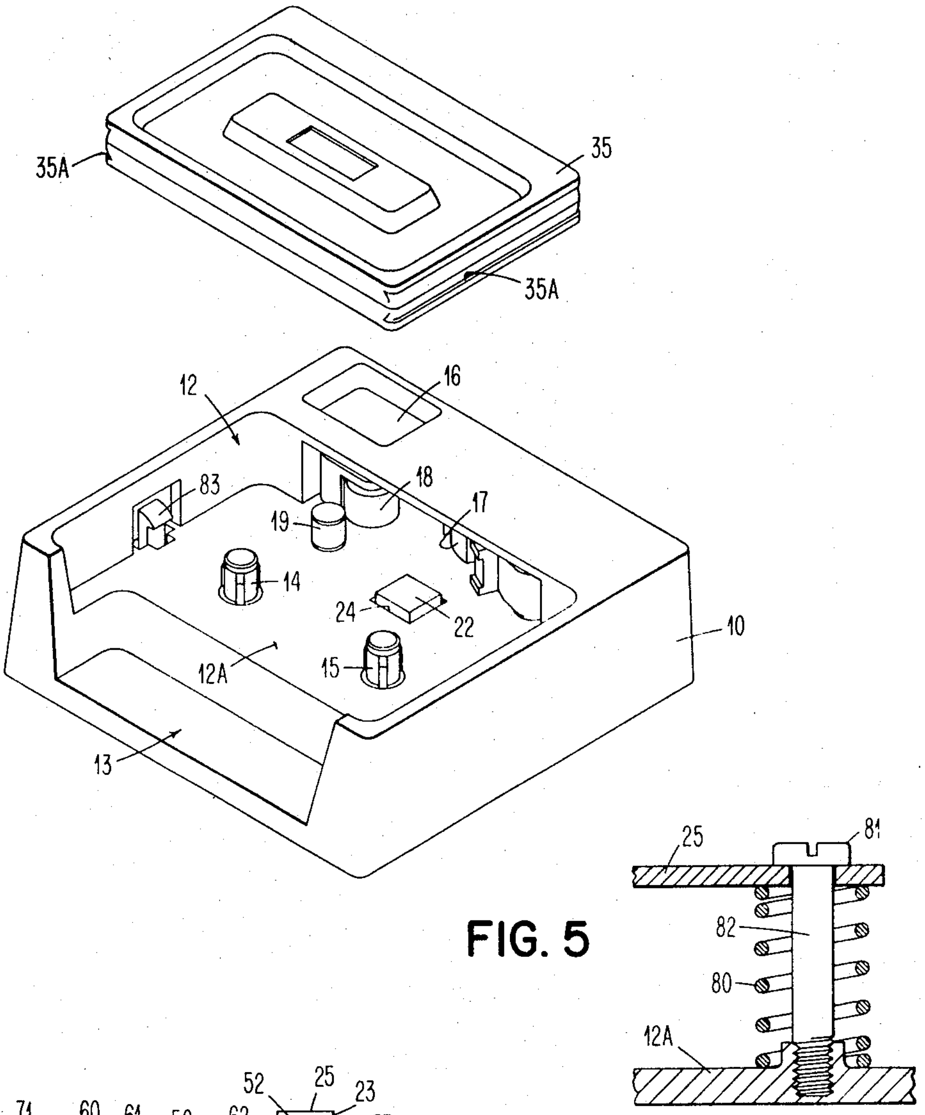
FIG. 5
FIG. 4
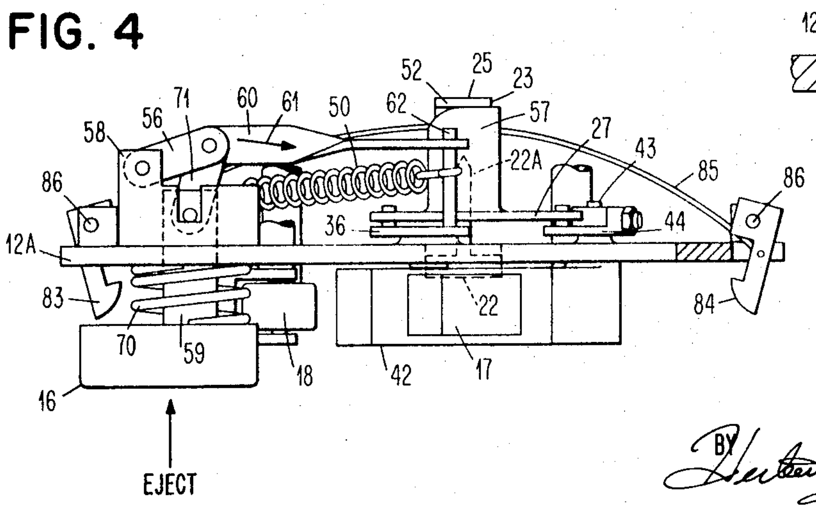
INVENTORS
DONOVAN M. JANSSEN
CLARENCE G. MEYER
BY
ATTORNEY

CARTRIDGE LOCK ACTUATOR

BACKGROUND OF THE INVENTION

This invention relates to actuating mechanisms for cassette/cartridge holddowns and the like and particularly to such actuators of simple construction and usable on cassette types of playing and operating mechanisms.

Cassette or cartridge magnetic tape and motion picture playing devices are receiving increased popularity in the audio, pictorial, and digital recording fields. There have been a multitude of different variations of cassette players. Many of these players load the cassette broadside; that is, the cassette is moved parallel to the axes of rotation of the spools in the cassette. While the cassette is in the operating or playing/recording position, its exact location can be important if the number of record tracks on the media contained by the cassette have a relatively short width, for example, a few thousandths of an inch. Of concern here, is the registration of the record member with the transducer which effects playback or recording. Accordingly, it is advantageous to force the cassette hard against a reference surface for precisely locating the cassette with respect to operating members in the cassette player.

Some of the cassette players have coordinated insertion, ejection, and actuation of other members between loading and operating positions. Included in some of these devices are cassette holddowns for accomplishing the above-described registration. Such holddowns should be further coordinated in action between loading and operating positions along with all of the other mechanisms. Because of cost consideration, such coordination should be provided with a minimum of mechanisms and with as simple as possible connecting links which require low maintenance.

SUMMARY OF THE INVENTION

It is an object of the present invention to provide an extremely simple, reliable, and inexpensive holddown actuator/release for use in a cartridge/cassette operating device.

An actuator constructed in accordance with the present invention for synchronously moving a pair of spaced-apart members includes a flexible member extending therebetween spring-urged upwardly for yieldably urging the two spaced-apart members to a first position. Spring means are compressed for releasing the flexible member with the spaced-apart members being spring-urged to the second position. By successively actuating the flexible member between tension and release positions, the spaced-apart members are moved between their two respective positions. Resiliency of the flexible member may urge the two members to the second position.

Embodying the present invention in a cassette tape player, the first position is a cassette-retaining position wherein the spaced-apart members are a pair of holddowns releasably engaging a cassette in operating position. Upon cassette ejection by means outside the present invention, the flexible member is released from tension; and the two holddowns (spaced-apart members) are urged to a second position releasing the cassette for ejection.

The foregoing and other features and advantages of the invention will be apparent from the following more particular description of a preferred embodiment of the invention, as illustrated in the accompanying drawings.

BRIEF DESCRIPTION OF THE DRAWINGS

FIG. 1 is a simplified perspective view of a cassette player which may use the present invention together with a cassette ready to be loaded into the player—all members are in the loading position;

FIG. 4 is a simplified sectional view taken in the direction of the arrows along line 4—4 in FIG. 2. FIG. 4 is upside-down from the FIG. 1 view;

FIG. 5 is a simplified diagrammatic showing of the spring urging portion of the apparatus used to illustrate the present invention.

DETAILED DESCRIPTION

Figure 2:
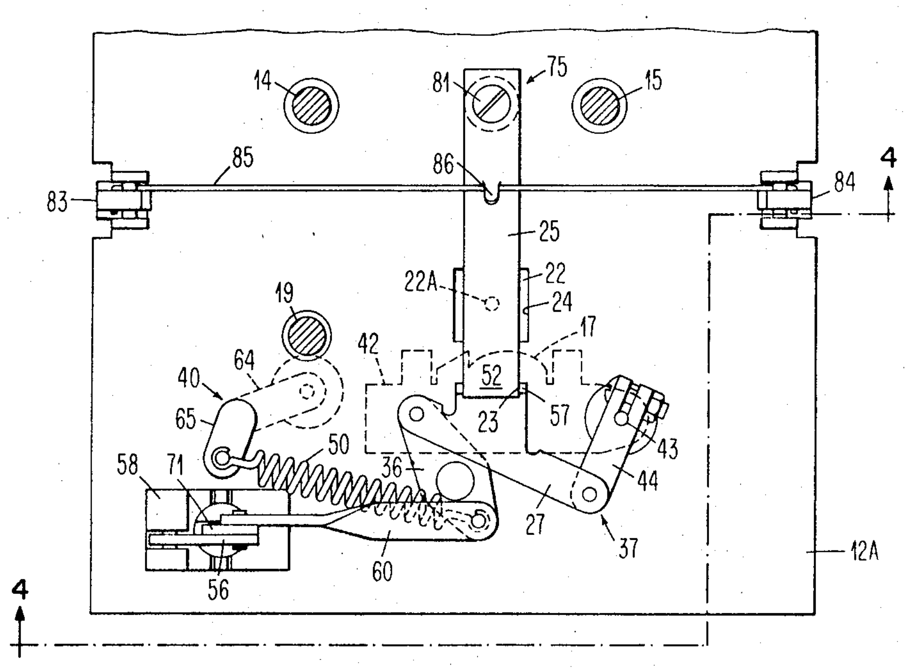
FIGS. 2 and 3, respectively, show the mechanisms on the underside of the FIG. 1 illustrated cassette player, respectively, in the operating and loading positions. The presentations are simplified to more clearly illustrate the invention.

Referring now more particularly to the drawings, like numerals and characters indicate like parts and structural features in the five views.

Housing 10 has cassette receiving well 12 with the front opening and hand receiving recess 13 for facilitating removal of a cassette ejected from an operating position but still retained in well 12. A pair of upstanding spool spindles 14 and 15 slidably receive hubs of spools (not shown) within cassette 35 to be used with the player and then drive the spools, respectively. In a single spool cartridge, only one spindle may be used. Actuating pushbutton 16 downwardly moves transducer 17 and pinch roller 18 from a tape engaging or operating position to a tape disengaged or loading position and then, after a small amount of lost motion, substantially simultaneously releases ejection member 22 for upward movement through aperture 24 to eject cartridge 35 from its operating position. The present invention provides simplified means for operatively connecting and coordinating action between the above-described mechanisms and a pair of cassette holddown members 83 and 84 pivotally secured on opposite end portions of well 12 and actuated via the linkage in accordance with the present invention.

The FIG. 1 illustrated cassette player operates with tape-containing cassette 35 having a pair of coplanar reels (not shown) with spindle receiving hubs (not shown) and a tape opening window (not shown) in accordance with usual cassette construction for permitting operative engagement between transducer 17 and pinch roller 18 with tape in the cassette. Additionally, an aperture in cassette receives rotatable capstan 19 for moving the tape between the spools. Spool drive means (not shown) selectively rotate drive spindles 14 and 15 in coordinated action while simultaneously rotating capstan 19 in the appropriate sense for transporting tape between the two spools. Signal processing circuits (not shown) are electrically connected to transducer 17 for effecting transducing operations with magnetic tape in cassette 35. Other devices associated with magnetic tape signal processing may be added in the practical embodiment.

Insertion of cassette 35 over spool spindles 14 and 15 engages the ejection member 22 urging it downwardly into its operating position. Downward movement of ejection member 22 moves ejection member arm 25 to disengage its surface 23 from a corresponding surface on connecting link 27. This release allows spring-urged action for moving transducer 17 and pinch roller 18 into operative engagement with tape in cassette 35. Practically simultaneously therewith, pushbutton 16 is released upwardly for subsequent ejection while holddown members 83 and 84 are moved inwardly for grasping and releasably retaining cassette 35 in well 12.

Before detailing the operations of the present invention, it is well to understand the single action ejection and insertion mechanism with which the present invention is advantageously used. This mechanism is described by the following action of a cassette insertion.

Figure 3:
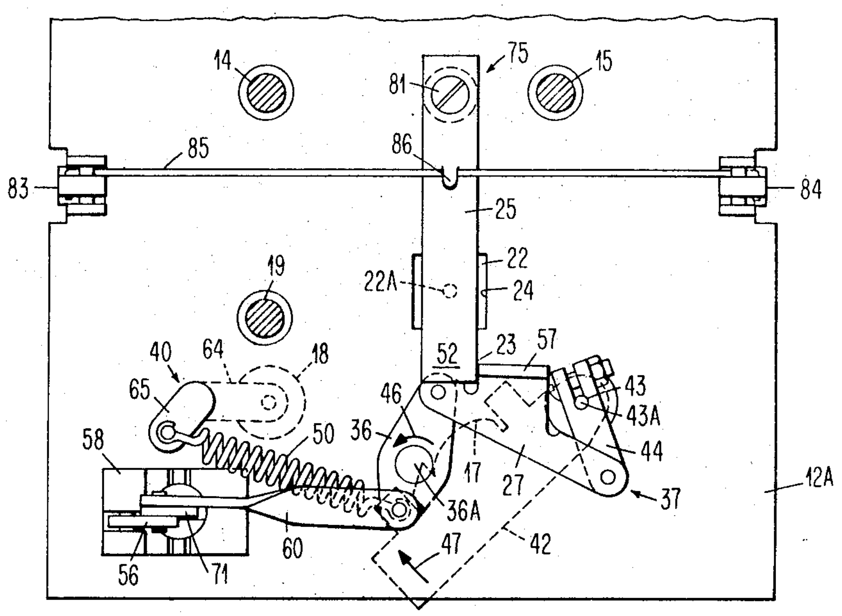

Depression of ejection member 22 moves depending shank 22A and, hence, arm 25 downwardly. As best seen in FIG. 3, downward movement of arm 25 releases edge 23 from depending flange 57 on pivoted member 27. Arm 25 has end portion 52 below depending flange 57, as best seen in FIG. 4. Spring 70 disposed between pushbutton 16 and platform 12A urges the mechanism from the position shown in FIG. 3 (loading position) to that shown in FIGS. 2 and 4 (operating position).

The action from spring 70 extending to all of the other parts is now traced. Extension of spring 70 moves shank 59 pulling arms 56 and 60 in the direction of arrow 61 through intermediate arm 71. Arm 56 is pivotally secured to depending boss 58. This action tends to elongate the distance between the pivot point in boss 58 and depending pivot rod 62. During this motion, arm 60 slides toward platform 12A. This movement causes main pivot member 36 to rotate in the direction of arrow 46 about vertical pivot axis 36A. This rotation moves member 27 and depending flange 57 under arm 25 (FIG. 2). Transducer 17 mounted on arm 42 is pivoted in the direction of arrow 47 about vertical pivot axis 43A formed in pivot rod 43. Arm 44 connects pivot rod 43 to member 27. The latter mechanism is called first linkage means 37 while arms 56 and 60 are termed second linkage means 39.

Fourth linkage means 40 connects main pivot member 36 to pinch roller 18. Extension spring 50 had been compressed in FIG. 3 to operate as a rod forcing pinch roller 18 to illustrated position. Upon main pivot member 36 being pivoted in the direction of arrow 46, extension spring 50 extends providing some lost motion. As soon as the spring-urging point of extension spring 50 is reached, arm 65 pivots counter-clockwise as seen in FIG. 3. Rod 63 transfers the pivoting action to arm 64 and, hence, pinch roller 18 to move against rotating capstan 19 on the upper side of platform 12A.

When the mechanism is in the operating position shown in FIG. 2, depression of pushbutton 16 overcoming spring 70 urging pivots main pivot member 36 in the opposite sense to arrow 46, moving depending flange 57 from underneath arm 25. Arm 25 and the later-described mechanism are termed the second linkage means and are used to interconnect holddowns 83,84, ejection member 22, and member 27.

In the portion of the description concerning the inventive features, arm 25 is yieldably urged by spring 80 against head 81 of bolt 82 secured in platform 12A. This mechanism is located at point 75, as best seen in FIGS. 2 and 3. Spring 80 yieldably urges arm 25 to be parallel with platform 12A. This corresponds to the loading position shown in FIG. 3. Depression of ejector member 22 by a cassette 35 pivots arm 25 about head 81 distorting spring 80. This distortion is stored in spring 80 by latching arm end portion 52 on depending flange 57. During ejection, depression of button 16 releases arm 25 such that spring 80 quickly returns it to the ejected position. This quick return causes cassette 35 to be readily ejected. Spring 80 also accommodates any overtravel of ejection member 22 when depressed by cartridge insertion.

Holddowns 83 and 84 have coordinated action therewith by wire 85 being retained on arm 25 by catch 86. In the ejected position, wire (flexible resilient member) 85 is in a released state; that is, not under tension. In the operating position shown in FIG. 2, arm 25 had been pivoted placing wire 85 under tension. This tension pivots holddowns 83 and 84 such that the catches on the upper end portions thereof engage cassette 35 for securing it. Wire 85 is connected to holddowns 83 and 84 above the pivot points 86 on depending lugs formed on platform 12A. With wire 85 under tension, holddowns 83 and 84 are pulled toward each other. With wire 85 relaxed, the inherent resiliency of the wire pushes holddowns 83 and 84 outwardly for releasing cassette 35.

Variations of the urging on arm 25 may be provided. For example, arm 25 itself may be a spring member biased to a horizontal position and deformed during each cassette insertion. Other forms of implementing the same invention may be readily thought of with no limitation intended to the specific embodiment shown in the present application.

Cooperation between holddowns 83 and 84 are preferably on the lower lips 35A of cassette 35. Grooves in the end portions of cassette 35 form a flat lip 35A readily engageable by the holddowns 83 and 84. In the alternative, holddowns 83 and 84 may engage the upper surface of cassette 35. The lips are preferred because no strains are introduced into the cassette by holding down the lower portion thereof. Platform 12A provides a precise reference surface for holding cassette 35 in appropriate registration with transducer 17 and pinch roller 18.

While the invention has been particularly shown and described with reference to a preferred embodiment thereof, it will be understood by those skilled in the art that various changes in form and details may be made therein without departing from the spirit and scope of the invention.

What is claimed is:

1. A connecting mechanism for providing coordinated action between a pair of spaced-apart facing movably mounted holddown members, comprising, a flexible member attached at each end to said spaced-apart members and having a length greater than the spacing between said members at said attachments;

means for selectively applying tension to said flexible member for moving said spaced-apart members toward each other to a first position and for selectively releasing said flexible member from any tension such that said spaced-apart members are free to move apart from said first position to a second position;

a cartridge receiving platform movably supporting said holddown members on opposite ends thereof and having an aperture intermediate said holddown members;

said tension applying means comprising:

an ejector member movable through said platform aperture;

means connecting said ejector member to said flexible member such that when a cartridge is inserted on said platform and said ejector member moves through said platform aperture, it tensions said flexible member; and ejection means forcing said ejector member through said platform aperture for ejecting the cartridge thereon and simultaneously releasing said flexible member for releasing said holddown members for movement to said second position, a cartridge releasing position.

2. The subject matter of claim 1 wherein said holddown members have cartridge retaining portions and are pivotally mounted to said platform at said opposite ends and said flexible member being attached thereto on the same side of said pivotal mounting as said retaining portions.

3. The subject matter of claim 2 further including a bolt on said platform having a large head, an arm member extending from said head to said ejector member and having a catch thereon;

said flexible member being secured to said arm at said catch and exhibiting resiliency;

a spring disposed between said platform and said arm underneath said head for yieldably urging said arm to a first position whereat said flexible member is released for yieldably urging said holddown members to said second position; and said ejector member holding said arm in a pivoted position whereby said spring is distorted while said flexible member is under tension and releasing said arm for pivoting motion toward said horizontal position by said spring for simultaneously urging said ejector member through said platform and releasing said flexible member from said tension.

4. The subject matter of claim 3, wherein said holddown members are pivotally secured respectively to a pair of depending lugs on said platform with said flexible member being secured thereto intermediate catch means on the holddown members and said pivot points, respectively, with said catch means extending above the platform for engaging a cartridge insertable thereon in response to the cartridge moving said ejector member through the platform aperture.

* * * * *